United States Patent Office 3,098,105
Patented July 16, 1963

3,098,105
ALKANOL PHENOXY THIOETHERS
Walter Reifschneider, Midland, Mich., assignor to The Dow Chemical Company, Midland, Mich., a corporation of Delaware
No Drawing. Filed June 27, 1962, Ser. No. 205,521
3 Claims. (Cl. 260—609)

The present invention is directed to thioethers and in particular is directed to novel thioethers corresponding to the formula

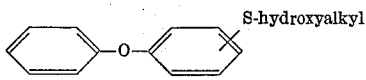

In the present specification and claims, "hydroxyalkyl" represents a group of the formula $$-C_nH_{2n}OH$$

wherein $n$ represents an integer of from 2 to 6, inclusive.

The novel compounds are colorless to pale colored oils or crystalline solids, slightly soluble in water but readily soluble in various common organic solvents such as lower alkanols, benzene and the like. The compounds are useful as parasiticides and herbicides. Various of them are distinctly coccidiostatic.

The compounds are prepared by a process which comprises the steps of causing a reaction between an aromatic halide compound corresponding to the formula

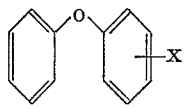

wherein X represents halogen, and a mercaptoalkanol or the alkali metal or cuprous salt formed with the mercapto groups. During the reaction to prepare the present compounds, one molecule of mercapto alkanol reacts with each molecule of aromatic halide. Small amounts of mercaptoalkanol may be lost in side reactions. Thus, when it is desired to prepare the present compound in a high state of purity and with a minimum of necessary post-synthesis purification procedure, the starting reactants should be employed in approximately equimolecular proportions. However, other proportions may be employed if desired, and unconsumed starting material of whatever identity may, if desired, be recycled into further synthesis process.

The reaction goes forward at temperatures over a wide range, such as from 20° C. to 350° C., but initiates most readily when heated to a temperature somewhat higher than room temperature; 80° to 180° C. is preferred. Under these conditions the reaction is, in general, exothermic and goes forward to completion with good yield calculated upon the basis of consumed starting material. Hydrogen or metallic halide of reaction is evolved. Means for orderly disposal of hydrogen halide are advantageously provided.

Typically, in the preparation of the compounds of the present invention, reaction between the mercaptoalkanol starting material and the aromatic halide starting material will initiate and go forward only when there is employed, a catalytic amount of both a source of cuprous ion and a nitrogenous base. Thus, in the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed amount is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as an aromatic or aliphatic hydrocarbon.

In laboratory amounts it is preferred to employ a liquid nitrogenous base catalyst substance in sufficient excess that portions of it may act as solvent, portions as hydrogen halide acceptor and yet further portions may continue to function, unreacted, in the necessary catalytic manner.

In carrying out the reaction to prepare the compounds of the present invention, the aromatic halide and the mercaptoalkanol are intimately mixed and blended, in any order and in desired amounts, with source of cuprous ion and nitrogenous base as hereinbefore described, and thereafter heated, to a temperature at which reaction takes place promptly. In one convenient method of practicing the present method, the reaction temperature may be the reflux temperature of the liquid reaction mixture. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. In any event the reaction product is extracted with solvent, the solvent extract dried over an inert drying agent such as, for example, anhydrous potassium sulfate or the like; the solvent vaporized and removed and the remaining product fractionally distilled: or it may be chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example 1.—3-(p-Phenoxyphenylthio)Ethanol*

A reaction mixture is prepared, consisting of 373.6 grams (1.5 moles) of p-bromophenyl phenyl ether, 30 grams of cuprous bromide, and 117.5 grams (approximately 1.5 moles) of 2-mercaptoethanol dispersed in 800 milliliters technical grade 2,4-lutidine. The resulting reaction mixture is placed in a flask under reflux. In this situation, the reaction mixture is heated at its reflux temperature (a pot temperature between approximately 150° and 175° C.) for 30 hours, with stirring, to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and was extracted with ether, the ether extract liquid being saved. This liquid is dried over a bed of anhydrous potassium sulfate; the resulting liquid was warmed to vaporize and remove ether solvent and obtain a residual oil. This oil was fractionally distilled at gradually rising temperatures and declining subatmospheric pressure, to obtain a colorless, oily 3-(p-phenoxyphenylthio)ethanol. The product has a molecular weight of 262.4.

*Example II.—3-(o-Phenoxyphenylthio)-1-Propanol*

In procedures essentially similar to the foregoing except that o-bromophenyl phenyl ether is employed in the reaction mixture instead of the p analogue, and the mercaptoalkanol is 3-mercaptopropanol, there is obtained a 3-(o-phenoxyphenylthio)-1-propanol product as white crystals readily soluble in various common organic solvents, and melting at 67.5°–68.5° C. The compound is coccidiostatic, and, when introduced at a concentration of 10 parts per million in water kills 100 percent of a population of milfoil growing therein.

In procedures essentially the same as the foregoing, by the use of appropriate starting materials, other products of the present invention are prepared as follows:

From p-bromophenyl phenyl ether and 2-mercaptopropanol, a 2-(p-phenoxyphenylthio)-1-propanol product.

Also, employing the sodium mercaptide salt of 2-mercaptopropanol in procedures otherwise like the foregoing, there is obtained a 2-(p-phenoxyphenylthio)-1-propanol product.

From o-chlorophenyl phenyl ether and 1-mercapto-2-hexanol, a 2-(o-phenoxyphenylthio)-1-propanol, as a glassy to viscous liquid.

I claim:

1. A compound corresponding to the formula

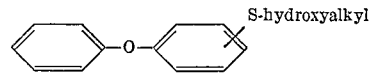

wherein "hydroxyalkyl" represents a group of the formula $$-C_nH_{2n}OH$$

wherein $n$ represents an integer from 2 to 6, inclusive.

2. 3-(o-phenoxyphenylthio)ethanol.
3. 3-(o-phenoxyphenylthio)-1-propanol.

No references cited.